United States Patent [19]

Johnson

[11] 4,175,944
[45] Nov. 27, 1979

[54] REMOVAL OF FLUORINE DURING PRODUCTION OF FERTILIZER

[75] Inventor: George C. Johnson, Princeton, N.J.

[73] Assignee: Mobil Oil Corporation, New York, N.Y.

[21] Appl. No.: 918,992

[22] Filed: Jun. 26, 1978

[51] Int. Cl.$^2$ .................... C05B 11/06; C05B 11/00
[52] U.S. Cl. .................................... 71/39; 71/40; 71/43; 71/DIG. 3; 423/167; 423/308
[58] Field of Search ................ 71/DIG. 3, 37, 39, 40, 71/42, 43, 49, 51; 423/304, 483, 301, 310, 465, 321 R, 464, 167, 307, 308, 319, 320

[56] References Cited

U.S. PATENT DOCUMENTS

| | | | |
|---|---|---|---|
| 2,995,436 | 8/1961 | Hollingsworth et al. | 71/DIG. 3 |
| 3,028,230 | 4/1962 | Brosheer | 71/DIG. 3 |
| 3,049,417 | 8/1962 | Bradley et al. | 71/39 X |
| 3,076,691 | 2/1963 | Carothers et al. | 71/DIG. 3 |
| 3,582,313 | 6/1971 | Strelzoff et al. | 71/39 X |
| 3,585,021 | 6/1971 | Geissler | 71/37 X |
| 3,600,154 | 8/1971 | Slot et al. | 71/37 X |
| 4,046,860 | 9/1977 | Kidde | 423/321 R |
| 4,056,604 | 11/1977 | Thompson et al. | 423/483 |

FOREIGN PATENT DOCUMENTS

| | | | |
|---|---|---|---|
| 2092692 | 1/1972 | France | 71/39 |
| 491600 | 2/1976 | U.S.S.R. | 71/39 |
| 564297 | 8/1977 | U.S.S.R. | 71/37 |

Primary Examiner—Kenneth M. Schor
Attorney, Agent, or Firm—Charles A. Huggett; Raymond W. Barclay; Claude E. Setliff

[57] ABSTRACT

The invention provides a novel process for the removal of fluorine during the production of fertilizer by precipitating the ion during the ammoniation step and recovering same by pyrolysis.

To recover the fluorine the fertilizer is first separated out as a filtrate and the precipitate is heated to evolve ammonium fluoride, which heating is done in an ammonia atmosphere.

4 Claims, No Drawings

REMOVAL OF FLUORINE DURING PRODUCTION OF FERTILIZER

BACKGROUND OF THE INVENTION

1. Field of the Invention

The invention relates to a process for removing fluorine. More particularly, it relates to a process for removing fluorine during the production of fertilizer from nitric acid, sulfuric acid and a phosphate source, e.g. from the raw ore or from slimes or other by-products from phosphate ore beneficiation and ammonia. Ammonium sulfate can be used instead of sulfuric acid.

2. Discussion of the Prior Art

A common method of producing both suspension and solution fertilizers containing nitrogen and phosphate is by ammoniation of phosphoric acids, especially wet-process phosphoric acid. As is taught in U.S. Pat. No. 4,066,432, there are several major routes from phosphate rock to such fluid fertilizers.

One route is the use of the direct process, using the heat of ammoniation to convert wet-process acid to an ammonium polyphosphate melt. A second route involves the direct two-stage ammoniation process as taught in U.S. Pat. No. 3,813,233 for the production of orthophosphate suspension by ammoniation by wet-process acid to from concentrated N-$P_2O_5$.

In many processes employing fluorapatite ores hydrofluorsilicic acid is a by-product of the manufacture of superphosphates. Fluorine is usually removed as volatile hydrogen fluoride and silicon tetrafluoride when phosphate rock is dissolved in hot acid. These fluorine compounds are then scrubbed out from the gases. U.S. Pat. No. 4,062,929 teaches producing HF by reacting $H_2SiF_6$ with ammonia to give ammonium fluoride which is fed with partly recycled alkali metal fluoride to a continuously operated reactor where a bifluoride of an alkali metal is formed in aqueous solution. The solid alkali metal bifluoride is heated to produce HF.

There is an extensive discussion of the chemistry of recovering phosphates in an article by D. R. Peck entitled "The Utilization of Phosphorus Minerals", found in Mellor's Comprehensive Treatise on Inorganic and Theoretical Chemistry, Vol. VIII, Supplement III, p. 71 (1971).

SUMMARY OF THE INVENTION

In a method for producing fertilizer by the steps of:
(1) reacting a phosphate source with nitric acid;
(2) separating unreacted solid from the liquid and reacting the liquid with sulfuric acid or ammonium sulfate to precipitate gypsum;
(3) filtering and reacting the filtrate with ammonia up to a pH of about 7.0;
(4) filtering to remove the precipitate; and
(5) evaporating water to recover the fertilizer,
whereby following step (4) the precipitate is dried and heated to at least 450° C. to remove the fluorine in the volatile material and collect it as ammonium fluoride, ammonium bifluoride or a related compound. "Phosphate source" will be understood to mean raw ore, by-products of the flotation process for beneficiation phosphate ore, including slime, and the like.

DESCRIPTION OF SPECIFIC EMBODIMENTS

Phosphate ore as mined, without any special preparation, may be used in preparing fertilizer by this method. However, even phosphate slimes may be used to advantage.

Reaction with $HNO_3$

The main phosphorus mineral in the ore is fluoropatite, $Ca_{10}(PO_4)_6F_2$, which reacts with nitric acid by the equation:

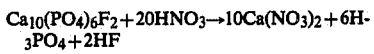
$$Ca_{10}(PO_4)_6F_2 + 20HNO_3 \rightarrow 10Ca(NO_3)_2 + 6H_3PO_4 + 2HF$$

The ore contains carbonate, in the form of the incompletely defined carbonate apatite, and may be represented by the carbonate ion:

$$CO_3^= + 2HNO_3 \rightarrow 2NO_3^- + CO_2 \uparrow + H_2O$$

The carbon dioxide is given off as a gas during the reaction and has served as an indicator of the completion of the reaction. The carbonate is an integral part of the mineral, for example, as $Ca_{10}(PO_4)_5CO_3OHF_2$, and $CO_2$ evolution ceases when the ore is completely dissolved. The hydrogen fluoride shown in the reactions above probably reacts further to form complex ions, such as $AlF_6^\equiv$ or $AlF_2^+$. Wavellite in the ore would also dissolve:

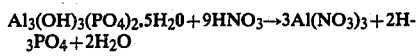
$$Al_3(OH)_3(PO_4)_2 \cdot 5H_2O + 9HNO_3 \rightarrow 3Al(NO_3)_3 + 2H_3PO_4 + 2H_2O$$

Also part of the ore may be hydroxyapatite:

$$Ca_{10}(PO_4)_6(OH)_2 + 20HNO_3 \rightarrow 10Ca(NO_3)_2 + 6H_3PO_4 + 2H_2O$$

The nitric acid concentration may range, practicably, from about 10% to about 70% in water. For example, the acid might be the 61% to 65% $HNO_3$ produced on site. There should be at least enough $HNO_3$ present to satisfy the material balance in the above formula. Desirably, a slight excess, i.e. about 20% over the theoretical amount required for complete reaction, may be used.

The temperature is not critical, except that it should, for the purpose of the present invention, be kept low enough to prevent the loss of fluorine as volatile HF or $SiF_4$. Thus the temperature of reaction of the ore with $HNO_3$ will be within the range of from ambient to 60° C., preferably from about 35°–45° C.

The ratio of water to ore used in the reactor is a compromise between two factors:

(1) Higher water/ore ratios facilitate the liquid/solid separation after the reactor. At low water/dry ore ratios (0.64 g/g) a foamy, gelatinous reactor product is formed that can barely be poured through a 24/40 standard taper joint and looks like a tan meringue.

(2) Higher water/ore ratios add to the heat load of the evaporator and also make it more difficult to precipitate all of the gypsum.

The optimum value for the water/dry ore ratio was found to be 1.2 to 1.8 g/g.

At the conclusion of the reaction period, which should range for from 10 to 30 minutes, the reactor will contain sand, clay and some other solids plus a solution containing ions of calcium, aluminum, iron, magnesium, phosphorus, fluorine, silicon, nitrate and uranium.

The reactor effluent may be separated into solid and liquid by one of several methods, including centrifuging, filtering and settling. Of the three, centrifuging or settling is preferable on a commercial scale. The effluent is generally clear and yellow, with only traces of scum and low density particles. The reactor product is generally quite acid and will contain significant amounts of multivalent ions in solution.

Reaction to form gypsum (CaSO$_4$.2H$_2$O)

The filtrate is reacted with the sulfate ion to precipitate gypsum:

$$Ca^{++} + SO_4^= + 2H_2O \rightarrow CaSO_4.2H_2O$$

The purpose of this step is to eliminate calcium ions. If calcium ions are not removed, a relatively insoluble phosphate compound of calcium will be formed rather than the soluble diammonium acid phosphate. In precipitating the Ca$^{++}$ ion, either sulfuric acid or ammonium sulfate can be used as a source of sulfate ion. The solution should contain enough sulfate ion to react stoichiometrically with the calcium ion.

The temperature of reaction will be from ambient to about 80° C. Although short contact times, i.e. about 15 minutes, are sufficient to precipitate about 98% of the calcium, a disgestion period of from about 12 hours to about 16 hours is preferred to insure maximum precipitation.

Ammonia Reaction

The filtrate from the gypsum precipitate is neutralized with ammonia to a pH of 4.0–7.0. Aluminum, iron, uranium and fluoride ions concentrate in the precipitate at pH 4 and below, whereas magnesium and silicon ions also precipitate from the filtrate at pH 7.0, along with the desired ammonium, nitrate, and HPO$_4^-$ ions. Part of the ammonia and phosphate are lost in the ammonia precipitate as AlNH$_4$HPO$_4$F$_2$ and related materials.

The reaction with ammonia is maintained at a temperature of from ambient to about 80° C., preferably in a closed vessel to minimize ammonia loss.

The removal of fluoride ion from the fertilizer is desirable. One of the reasons is the reprecipitation of fluorapatite in calcareous soils, with attendant reduction of phosphate available as a fertilizer. Another is the occurrence of fluorosis in mature cattle fed on pasture fertilized with fluorine-containing fertilizer.

Evaporation

The filtrate from filtering the ammonia reaction product is evaporated to produce the fertilizer. The temperature during evaporation should be within the range of from about 130° C. to about 170° C. The temperature should not substantially exceed 170° C. since above that temperature there is excessive decomposition of (NH$_4$)$_2$HPO$_4$.

In practice, the final material will be either in solution or molten throughout the evaporation. On cooling, the mixture will set to a solid, and this may be collected in a prill tower or on a flaker.

While the method is applicable to production units, the following was done on a laboratory scale. Analyses of the ore used, on a dry basis, are given in Table I. Fossil shells, root fragments, sand grains and clay were among materials present in the ore. The weight of dry matrix was 84.33% of the weight of the raw matrix.

TABLE I

| Composition of Dry Matrix | |
|---|---|
| P, wt. % | 3.91 |
| Ca | 13.5 |
| Mg | .2 |
| F | 1.85 |
| Fe | .60 |
| Na | .23 |
| SiO$_2$ | 50.6 |
| Al$_2$O$_3$ | 4.73 |
| Organic | .55 |
| Ash, 1000° C. | 96.4 |
| U$_3$O$_8$ | .004 |
| Ra$^{(a)}$ | 1 × 10$^{-9}$ |
| P$_2$O$_5$ calc | 9.0 |
| BPL[Ca$_3$(PO$_4$)$_2$] calc | 19.6 |
| P/Ca atom ratio | .38 |
| F/Ca atom ratio | .29 |

$^{(a)}$On basis of U/Ra ratio averages of 2.94 × 10$^6$ in phosphate rocks.

The nitric acid fed was 40% in water. It was diluted in the experiment with water from the ore.

In a batch operation, 170 parts of wet phosphate matrix (having the above composition on a dry basis) and 100 parts of water were placed in a reactor and 150 cc of 40% HNO$_3$ was added with stirring over a period of several minutes. The total reaction time was 10 to 30 minutes. The reactor effluent was separated into solid and liquid by contrifuging at 637 times gravity. A centrifuge, which rotated stainless steel bottles in a circle of about 28.5 c. maximum diameter, was used at 2000 rpm for 10 minutes. The separation was sharp. The sand and clay present were plastered in an incline on the tube wall and did not slump when the tube was placed upright.

The effluent liquid from centrifuging was clear and yellow. Only traces of scum and a few low density pieces, probably root fragments, were poured from the centrifuge tube. No solid was suspended in the liquid layer. The reactor product was quite acid (i.e. pH 1 or 2) and contained significant amounts of aluminum, iron and calcium. The solid from centrifuging was washed with water, and the washings were combined with the liquid layer from the centrifuge. In commercial practice, the washings would be recycled to the reactor or used in the on-site nitric acid plant to absorb nitrogen oxides and then returned to the reactor.

Enough ammonium sulfate was added to react stoichiometrically with dissolved calcium ion. It was added as a solid to the filtrate from the initial reaction with nitric acid. The mass was stirred for 15 minutes at room temperature. The reaction mass was then vacuum filtered.

The gypsum precipitate was washed with water and the washings were added to the filtrate. It was an alabaster-white precipitate and had the appearance of analytical grade gypsum. It contained 0.34% wt. of phosphorus, 0.02% wt. of magnesium, 0.08% wt. of aluminum and 0.10% wt. of fluorine.

The filtrate, including the gypsum water washes, was treated with ammonia to a pH of 4 and the precipitate, containing calcium, aluminum iron, phosphate and fluorine ions, was removed by filtration and washed. The temperature of reaction was ambient to 100° C., i.e. the reaction began at room temperature and rose to 100° C. Ammonia was added as rapidly as convenient to keep the temperature below boiling. A few minutes sufficed. A closed system for ammonia addition was used in order to minimize ammonia loss.

The filtrate was raised to a pH of 8.0 and the water was evaporated at 170° C. The melt was substantially clear at the end of the evaporation period, and it was poured onto a cold stainless steel plate for solidification. The solid was a pale tan color.

About 3.6% of the phosphorus in the core remained in the unreacted solid. About 2.0% of the phosphorus in the ore was present in the gypsum. The remaining 94.4% of the phosphorus was collected in the fertilizer and the ammonia precipitate.

The fertilizer contained 0.86% sulfate, 0.39% calcium, 0.08% magnesium, 0.02% fluorine, 0.0024% iron, less than 0.01% aluminum oxide and 0.11% silicon dioxide, all by weight. The main components were ammonium nitrate, diammonium phosphate, monoammonium phosphate and ammonium sulfate.

At the ammoniation stage, a precipitate is formed containing most of the principal ions is complex form. While I do not know the precise composition of the precipitate, it is known to conain such complex molecules as $AlNH_4HPO_4F_2$
$AlNH_4PO_4F$
$FeNH_4HPO_4F_2$
$FeNH_4PO_4F$
$Ca_{10}(PO_4)_6F_2$ As has been stated, the usual method for removing fluorine is to react the ore with hot acid. Hydrogen fluoride and silicon tetrafluoride are volatile when the acid is hot and they appear with the gas. These fluorine gases are sometimes not properly scrubbed from the reaction gases and lead to air pollution. In other cases they are scrubbed with alkali or water but this adds the capital and operating costs of the scrubber. I have found that the fluorine can be retained in the reactor effluent by dissolving the phosphate source in acid below 60° C. and preferably in the range 35° to 45° C. The fluoride subsequently precipitates when the crude phosphoric acid is neutralized to pH 4 with ammonia. The fluoride can be removed directly from the precipitate as $NH_3 \cdot xHF$, where x is 1 to 4, by heating the precipitate from about 450° C. to about 550° C. for one minute or more, generally no more than 2 hours. By operating in an atmosphere of ammonia, no acid gases are evolved; air pollution is avoided, and the fluoride is recovered in a solid compound which is water soluble and particularly suitable for use as a chemical intermediate.

EXAMPLE

The following will illustrate recovery of the fluorine.

The ammonium precipitate from producing fertilizer substantially by the above was heated at 486° C. for 70 minutes to produce 0.95 g. of volatile solids, 7.16 g. of residue and 2 g. of volatile liquid and uncondensed gas. The volatile solid analyzed 59% HF and 15.7% $NH_3$. The observed $HF/NH_3$ mole ratio of 3.20.

After collecting, the ammonium fluoride may be reacted with sources of sodium and aluminum ions to convert it to $Na_3AlF_6$. It may also be reacted with a source of calcium, especially limewater or calcium nitrate, to produce a $CaF_2$ precipitate.

I claim:

1. An improved process for recovering fluorine liberated during the production of fertilizer by the steps comprising
   (1) reacting a phosphate source with nitric acid;
   (2) separating unreacted solids from the liquid and reacting the liquid with sulfuric acid or ammonium sulfate to precipitate gypsum;
   (3) filtering and reacting ammonia with the filtrate so that the filtrate reaches a pH of up to about 7.0;
   (4) filtering to remove the precipitate; and
   (5) evaporating water from the step (4) filtrate to recover the fertilizer;

the improvement whereby in step (1) the reaction is carried out at a temperature of from ambient to about 60° C. and in step (2) the reaction is carried out at a temperature of from ambient to about 80° C., and whereby the precipitate from step (4) is heated to about 450° C. to about 550° C. in an ammonia atmosphere to remove the fluorine as an ammonium fluoride.

2. The method of claim 1 wherein the precipitate of step (4) is heated at 486° C.

3. The method of claim 1 wherein the fluorine is removed as $NH_3 \cdot xHF$, wherein x is 1 to 4.

4. The method of claim 3 wherein x is 3.2.

* * * * *

UNITED STATES PATENT AND TRADEMARK OFFICE
CERTIFICATE OF CORRECTION

PATENT NO. : 4,175,944

DATED : November 27, 1979

INVENTOR(S) : GEORGE CHRYSLER JOHNSON

It is certified that error appears in the above-identified patent and that said Letters Patent are hereby corrected as shown below:

Column 5, line 6   "core" should read --ore--
Column 5, line 20  "conain" should read --contain--
Column 6, line 9   "7.16 g." should read --7.14 g.--

Signed and Sealed this

Fifteenth Day of April 1980

[SEAL]

Attest:

SIDNEY A. DIAMOND

Attesting Officer

Commissioner of Patents and Trademarks